United States Patent [19]

Vercellotti et al.

[11] Patent Number: 4,896,277

[45] Date of Patent: Jan. 23, 1990

[54] METHOD OF MAPPING REFRIGERATED CONTAINERS IN A POWER LINE CARRIER BASED MONITORING SYSTEM

[75] Inventors: Leonard C. Vercellotti, Oakmont; Arthur A. Anderson, Irwin, both of Pa.

[73] Assignee: Thermo King Corporation, Minneapolis, Minn.

[21] Appl. No.: 189,896

[22] Filed: May 3, 1988

[51] Int. Cl.$^4$ .............................................. G06F 15/46
[52] U.S. Cl. ........................ 364/551.01; 340/825.06; 340/825.07
[58] Field of Search ................... 364/200, 550, 551.01, 364/900; 340/310 A, 825.06, 825.07, 825.08

[56] References Cited

U.S. PATENT DOCUMENTS

| T104,003 | 3/1984 | Hall et al. ....................... 340/825.08 |
|---|---|---|
| 4,234,926 | 11/1980 | Wallace et al. ................ 364/551.01 |
| 4,334,307 | 6/1982 | Bourgeois et al. ................... 364/200 |
| 4,402,191 | 9/1983 | King ..................................... 62/239 |
| 4,409,797 | 10/1983 | King et al. ............................ 62/239 |
| 4,424,684 | 1/1984 | Waldschmidt et al. .............. 62/239 |
| 4,488,256 | 12/1984 | Zolnowsky et al. ................ 364/900 |
| 4,658,243 | 4/1987 | Kimura et al. ................. 340/825.07 |
| 4,663,725 | 5/1987 | Truckenbrod et al. ............. 364/505 |
| 4,683,531 | 7/1987 | Kelch et al. .................... 340/825.08 |
| 4,727,475 | 2/1988 | Kiremidjian ................... 340/825.08 |
| 4,742,335 | 5/1988 | Vogt .............................. 340/825.08 |
| 4,780,816 | 10/1988 | Connell .............................. 364/200 |

Primary Examiner—Parshotam S. Lall
Assistant Examiner—Christopher L. McKay
Attorney, Agent, or Firm—D. R. Lackey

[57] ABSTRACT

A method of mapping addresses of a plurality of refrigerated containers having remote monitoring units (RMUs) connected to a power line carrier based monitoring system which includes a master monitoring unit (MMU). The method adapts to the size of the expected number of containers to be mapped by any mapping command, to reduce the overall time to map either a large or small number of containers. The method includes the MMU selecting a modulo having a magnitude determined by the number of containers expected to be mapped, and the RMUs generating a random number within the range responsive to the modulo. The RMUs apply response messages to the power line, which include the addresses of the associated containers, at a time responsive to the magnitude of the random number.

20 Claims, 6 Drawing Sheets

MMU ROM MAP 84

| SHIFT VARIABLE | MASK | | | | MODULO |
|---|---|---|---|---|---|
| 0  | 1 1 1 1 | 1 1 1 1 | 1 1 1 1 | 1 1 1 1 | 65536 |
| 1  | 0 1 1 1 | 1 1 1 1 | 1 1 1 1 | 1 1 1 1 | 32768 |
| 2  | 0 0 1 1 | 1 1 1 1 | 1 1 1 1 | 1 1 1 1 | 16384 |
| 3  | 0 0 0 1 | 1 1 1 1 | 1 1 1 1 | 1 1 1 1 | 8192 |
| 4  | 0 0 0 0 | 1 1 1 1 | 1 1 1 1 | 1 1 1 1 | 4096 |
| 5  | 0 0 0 0 | 0 1 1 1 | 1 1 1 1 | 1 1 1 1 | 2048 |
| 6  | 0 0 0 0 | 0 0 1 1 | 1 1 1 1 | 1 1 1 1 | 1024 |
| 7  | 0 0 0 0 | 0 0 0 1 | 1 1 1 1 | 1 1 1 1 | 512 |
| 8  | 0 0 0 0 | 0 0 0 0 | 1 1 1 1 | 1 1 1 1 | 256 |
| 9  | 0 0 0 0 | 0 0 0 0 | 0 1 1 1 | 1 1 1 1 | 128 |
| 10 | 0 0 0 0 | 0 0 0 0 | 0 0 1 1 | 1 1 1 1 | 64 |
| 11 | 0 0 0 0 | 0 0 0 0 | 0 0 0 1 | 1 1 1 1 | 32 |
| 12 | 0 0 0 0 | 0 0 0 0 | 0 0 0 0 | 1 1 1 1 | 16 |
| 13 | 0 0 0 0 | 0 0 0 0 | 0 0 0 0 | 0 1 1 1 | 8 |
| 14 | 0 0 0 0 | 0 0 0 0 | 0 0 0 0 | 0 0 1 1 | 4 |
| 15 | 0 0 0 0 | 0 0 0 0 | 0 0 0 0 | 0 0 0 1 | 2 |

FIG. 7

MMU ROM MAP 86

| MODULO X | SHIFT VARIABLE #1 |
|---|---|
| MODULO Y | SHIFT VARIABLE #2 |
| MODULO Z | SHIFT VARIABLE #3 |
| INITIATE NEW MAP | |
| GENERAL NEW MAP | |
| CHANGE SHIFT MAP | |
| DECREMENT MAP | |
| MAPPING COMMAND | |
| N1 | N2 |

MAPPING SUBCOMMANDS { INITIATE NEW MAP, GENERAL NEW MAP, CHANGE SHIFT MAP, DECREMENT MAP }

FIG. 8

MMU RAM MAP 88

| MODULO |
|---|
| SHIFT VARIABLE |

FIG. 9

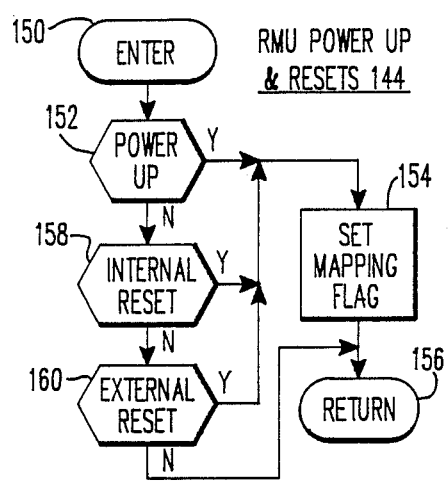
FIG. 11
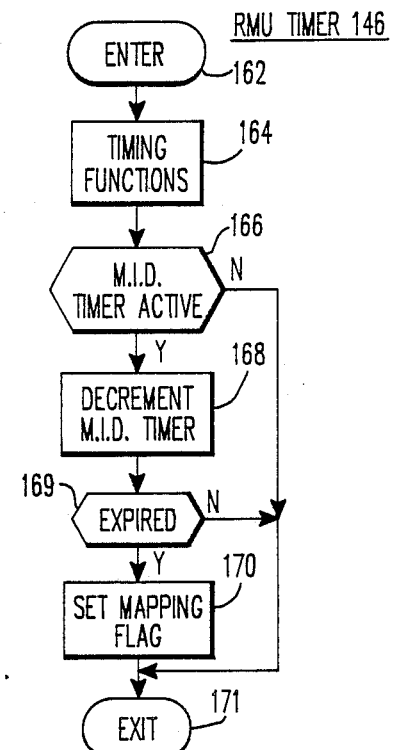
FIG. 12
RMU
RAM MAP 148
| SHIFT VARIABLE |
| MASK |
| REPLY COUNTER |
| MAP RANDOM NUMBER |
| MAPPING FLAG |
| RANDOM NUMBER |
| M.I.D. TIMER |
| N |
FIG. 13
```
           SHIFT VARIABLE=8   MODULO=256
         MASK  0000 0000 1111 1111
     RANDOM #  1011 0010 1001 0011
RESULT OF LOGICAL AND  0000 0000 1001 0011   (146 DECIMAL)
```
FIG. 14

4,896,277

1

METHOD OF MAPPING REFRIGERATED CONTAINERS IN A POWER LINE CARRIER BASED MONITORING SYSTEM

BACKGROUND OF THE INVENTION

1. Field of the Invention

The invention relates in general to the monitoring of refrigerated containers over electrical distribution power lines, and more specifically to the mapping of container addresses in such a monitoring system.

2. Description of the Prior Art

Concurrently filed Application Ser. No. 189,566 entitled "Power Line Carrier Communication System For Monitoring Refrigerated Containers" describes an arrangement for monitoring refrigerated containers, called "reefers", aboard ships and in ship terminals. The above mentioned application is hereby incorporated into the specification of the present application by reference. In general, the described power line carrier monitoring system monitors the temperatures and other status signals of the reefers by utilizing a master monitoring unit (MMU) which applies polling commands to an electrical distribution power line via a network central control unit (NCCU). Remote monitoring units (RMUs) associated with the reefers to be monitored pick up polling commands from the electrical distribution power line, and they prepare and return status messages to the MMU via the power line and the NCCU when each is uniquely addressed by the MMU.

One of the functions of the MMU is to log-in or map the connections of the reefers to be monitored as they are connected to the electrical distribution power line. Simply requesting any newly connected reefer to return its address to the MMU when initially connected is not practical, as there may be several hundred reefers. Upon powerup or system initialization all would try to use the power line at once. Error checking schemes in the messages would indicate the collisions, and the MMU would discard any address received in error. Thus, a method of orderly logging the unique addresses of the reefers into the MMU is required, so the MMU will thereafter periodically monitor all reefers connected to the monitoring system.

SUMMARY OF THE INVENTION

Briefly, the present invention is a new method of mapping the unique reefer addresses which minimizes the possibility of two or more reefers responding with their unique addresses at the same time, and which adapts to the size of its environment. In other words, instead of providing a mapping interval following every mapping command which is of sufficient duration to map the maximum number of reefers which may be connected to the monitoring system, the method automatically adapts to the number of reefers which are expected to respond to any mapping command by the MMU. When the MMU prepares a mapping command, it also adds a number to the message field indicative of the number of reefers the MMU expects still might be unaccounted for, and therefore unmapped in the monitoring system. This number indicates to the RMUs the range, or modulo, of integers within which each RMU is to provide a random number.

If the expected number of reefers is large, as would be the case when power is initially applied to a major portion of the system, the number selected by the MMU for incorporation into the mapping message is associated with a large modulo. The large modulo spreads the random numbers generated by the RMUs over a large range of numbers, reducing the possibility of message collision.

When the number of reefers expected to report their addresses is small, such as in response to periodic mapping commands made by the MMU after system initialization, then the number selected by the MMU for incorporation into the mapping message is associated with a small modulo. The small modulo reduces the number of mapping commands and the time required to update the system, while still minimizing message collisions as only a few reefers will be responding to the message command.

BRIEF DESCRIPTION OF THE DRAWINGS

The invention may be better understood and further advantages and uses thereof more readily apparent when considered in view of the following detailed description of exemplary embodiments, taken with the accompanying drawings, in which

FIG. 7 is a ROM map illustrating shift variables, masks, and modulos, which may be selected by the MMU program shown in FIG. 6;

FIG. 8 is a ROM map illustrating mapping commands and subcommands used by the MMU program shown in FIG. 6, as well as preselected values from the ROM map of FIG. 7;

FIG. 9 is a RAM map illustrating program variables used by the MMU program of FIG. 6;

FIG. 11 is a flow chart of a RMU power up and reset program;

FIG. 12 is a flow chart of a RMU timer program;

FIG. 13 is a RAM map illustrating program variables used by the RMU programs of FIGS. 10, 11 and 12; and FIG. 14 illustrates certain of the program steps of the RMU program shown in FIG. 10.

DESCRIPTION OF PREFERRED EMBODIMENTS

Figure 1:
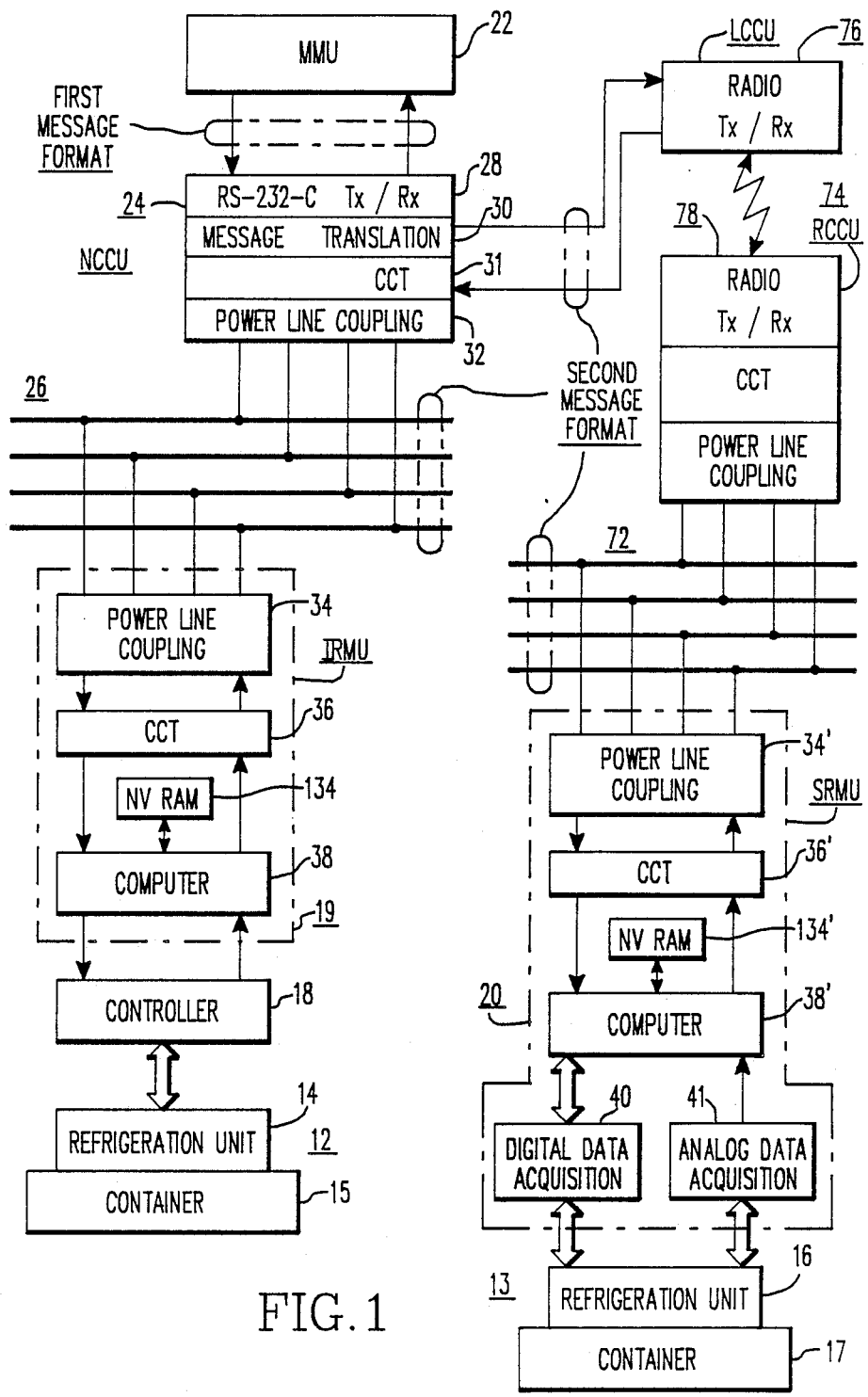
FIG. 1 is a block diagram of a power line carrier based reefer monitoring system which may utilize the teachings of the invention.

Referring now to the drawings, FIGS. 1, 2, 3 and 4 are similar to FIGS. 1, 2, 3 and 4, respectively, of the hereinbefore mentioned incorporated application, and the same reference numerals are used to identify like functions and components in both patent applications. FIG. 1 is a block diagram of a power line carrier based reefer monitoring system 10. System 10 may include one or more separate electrical distribution power lines having reefers to be monitored, with two power lines 26 and 72 being shown for purposes of example. Power line 26 will be called a local power line, and power line 72 will be called a remote power line. System 10 further includes a plurality of transportable refrigerated containers or reefers, such as reefer 12 associated with local power line 26 and reefer 13 associated with remote power line 72. Reefer 12 includes a refrigeration unit 14 which conditions the air in a container 16, and reefer 13 includes a refrigeration unit 16 which conditions the air in a container 17. U.S. Pat. Nos. 4,402,191; 4,409,797; and 4,4242,684, which are assigned to the same assignee as the present application, illustrate typical container refrigeration units.

Reefers 12 and 13 may be individually monitored by one of first and second different types of remote monitoring units (RMUs) 19 and 20, respectively, depending upon whether the reefer already has a computer based refrigeration monitor and controller 18 which can be communicated with. Remote monitoring unit 19 is illustrated as being associated with a reefer 12 which has such a controller 18, and remote monitoring unit 19 will be referred to as an integrated remote monitoring unit (IRMU) 19. Reefer 13 does not have a controller 18 and remote monitoring unit 20 will be referred to as a stand alone remote monitoring unit (SRMU) 20. The two different/types may be indiscriminately mixed on any power line. Controller 18 may be the refrigeration monitor and controller set forth in U.S. Pat. No. 4,663,725 entitled "Microprocessor Based Control System And Method Providing Better Performance And Better Operation Of A Shipping Container Refrigeration System", which is assigned to the same assignee as the present application. For the purposes of the present invention both types of remote monitoring units, the IRMU 19 and the SRMU 20, will be referred to collectively as RMUs.

The RMUs are monitored by a master monitoring unit (MMU) 22 which includes a central computer for preparing, transmitting and receiving messages. A network central control unit (NCCU) or first power line interface 24 is disposed between MMU 22 and the local electrical distribution power line 26 which extends to the locations of the plurality of reefers to be monitored. Communications between MMU 22 and NCCU 24 do not use power line 26, and a first message format 42 shown in FIG. 2 may be used which is tailored with minimal concern with electrical noise.

Figure 3:
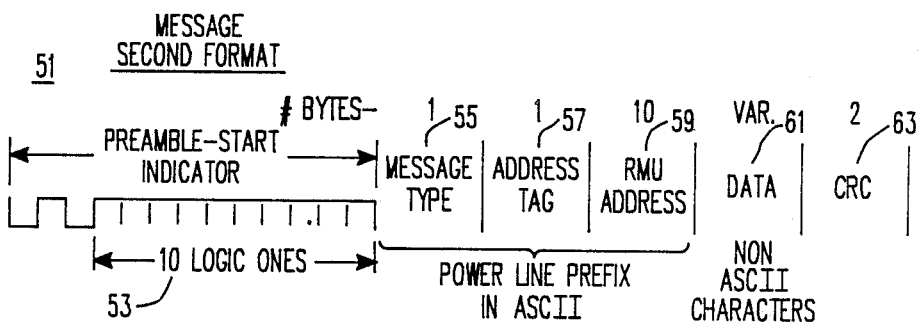
FIG. 3 sets forth a second message format which may be used in the system of FIG. 1.

As described in detail in the incorporated application, NCCU 24 includes a RS-232-C transmit receiver 28 for receiving messages from MMU 22 in the first format 42, translating means 30 for translating the first message format 42 to a second message format 51 shown in FIG. 3, modulator/demodulator means or carrier current transceiver (CCT) 31, and power line coupling means 32 which includes a coupling transformer and coupling capacitors for applying the modulated message to power line 26. The second format 51 is tailored for the severe power line environment.

Each RMU, such as IRMU 19, includes a power line coupling interface 34 which includes a coupling transformer and coupling capacitors, a carrier current transceiver (CCT) 36 for demodulating messages received from power line 26 and for modulating messages to be applied to power line 26, and a computer 38 for processing the commands in messages received from MMU 22 and for preparing and sending second formatted messages back to MMU 22 via power line 26 and NCCU 24.

As hereinbefore stated, MMU 22 may monitor reefers associated with more than one power line, as shown in FIG. 1, with additional power lines, such as power line 72, being monitored by a radio link 74. Radio link 74 includes a local central control unit (LCCU) 76 which includes a radio transmitter/receiver. Each remote power line, such as remote power line 72, includes a remote central control unit (RCCU) 78 which also has a transmitter/receiver. NCCU 24 translates messages received from MMU 22 from the first message format 42 to the second message format 51. An address tag located in a field 48 of the first message format 42 and in a field 57 of the second message format 51 provides a predetermined power line identification, which for purposes of example will be assumed to be an ASCII "A" for the local power line, an ASCII "B" for a first remote power line 72, etc. All RMUs, regardless of which power line they are connected to will only respond to messages which have an ASCII "A" in the address tag 57. If the message received by NCCU 24 from MMU 22 has an ASCII "A" in the address tag field 48, NCCU applies the message to local power line 26. If it has an identification other than an ASCII "A", LCCU 76 transmits the second formatted message by radio to all of the remote power lines. Each RCCU 78 receives the broadcast message, and if the address tag bears its unique identifier, the addressed RCCU 78 swaps its identifier for an ASCII "A" in the address tag field 57 and applies the message to its associated remote power line 72. Responses by the RMUs connected to the remote power line 72 are received by RCCU 78 which then swaps its identifier for the ASCII "A" in the address tag field 57 and broadcasts the message back to the LCCU 76, which directs the message to MMU 22 via NCCU 24. Thus, all RMUs, regardless of which power line they are connected to will see an ASCII "A" in the address tag field 57, and reefers and RMUs may be connected to any power line without modification.

Figure 2:
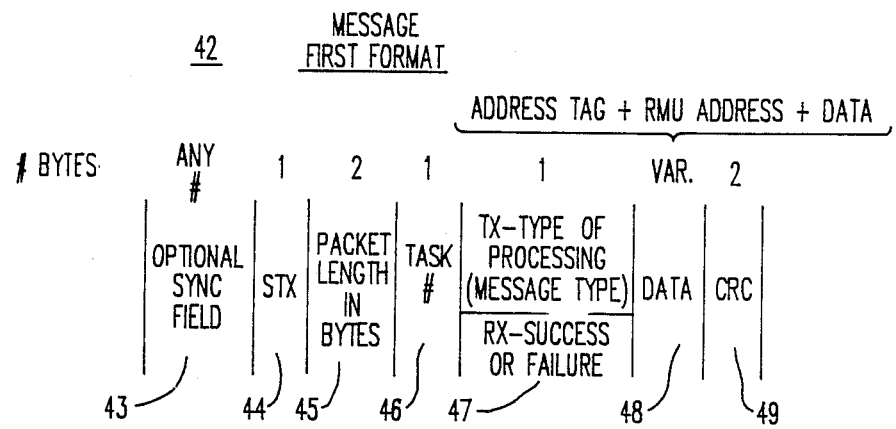
FIG. 2 sets forth a first message format which may be used in the system of FIG. 1.

A message format which may be used for the first format 42 is shown in FIG. 2. The first message format 42, when prepared by MMU 22 for transmission to NCCU 24, may start with an optional synchronization field 43 of any desired number of bytes, followed by a one byte character 44 which delimits the start (STX) of a valid message. NCCU 24 strips the synchronization field 43, if used, from the start of a message. When a valid start byte 44 is detected, the next two bytes 45 are used to define an unsigned integer which indicates the packet length in bytes of the following data. The following data includes a one byte task number 46 assigned by MMU 22, which is an identification number used only by MMU 22. The identification number is followed by a one byte character 47 which informs NCCU 24 as to the message type, i.e., the type of processing required. For example, the message may be directed only to NCCU 24 per se, such as for setting up internal configurations; or it may be a message which is to be applied to power line 26 and directed to all of the the RMUs, or to a specifically addressed RMU. A variable length data field 48 follows the message type identifier 47, with its contents depending upon the type of message to be processed. For example, if the message is to be applied to power line 26, the data field would contain an address tag, a universal or a specific RMU address, plus data relative to the type of command being sent. As hereinbefore stated, the address tag identifies a specific power line, when there is more than one under the control of MMU 22, and it allows expansion when there is only one. A two byte error check field 49, which is not part of the data packet defined by the packet length integer 45 follows, such as a field generated by using the cyclic redundancy check (CRC), i.e., a polynomial calculation performed on the message data bits.

The first message format 42 when prepared by NCCU 24 for transmission to MMU 22 includes the optional sync field 43, the starting character 44, and the two byte packet length 45. The task number used in field 46 is the same task number previously assigned to the MMU request for which this message is a response. NCCU 24 uses the one byte field 47 used by MMU 22 to indicate message type, to indicate success or failure in implementing the command received from MMU 22. The data field 48 includes the data resulting from the MMU command, e.g., RMU status data, followed by the CRC error checking field 49.

FIG. 3 indicates the second message format 51, which is used for radio and power line communications. A message starting preamble 53 includes at least three transition changes, required to synchronize communications between carrier receivers "listening" to the power line 26. The transitions are followed by ten logic ones.

The valid starting preamble 53 is followed by a one byte message type 55. NCCU 24 may use the same type-of-processing byte 47 described relative to the first message format 42 used between MMU 22 and NCCU 24, or NCCU 24 may tailor the message. A reply message from a RMU will use the same byte character in field 55 that was in the command received.

The address tag byte 57 for a message prepared by MMU 22 for the local power line 26 is the same as that provided in the data field 48 of the first message format 42. As hereinbefore explained, the address tag field 57 destined for a remote power line will include the unique power line identifier of the selected remote power line.

The next ten bytes define an address field 59. The address placed in field 59, which is the same address contained in the data field 48 of the first format 42, may be an address unique to a specific RMU, or it may be a universal address recognized by all RMUs. A universal address is used during system reset, and in the process of originally giving a RMU an unique address. As shown in FIG. 1, the unique RMU address is stored in non-volatile RAM 134. When MMU 22 is polling for reefer status data, it will insert a specific RMU address in field 59.

The one byte message type 55, the one byte address tag 57, and the ten byte RMU address 59, collectively called the power line prefix, are all in ASCII characters.

Figure 4:
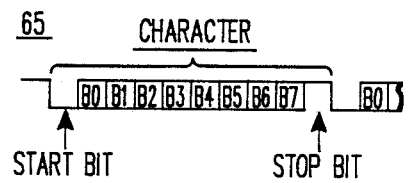
FIG. 4 sets forth a character format which may be used in the prefix and data portions of the message formats shown in FIGS. 2 and 3.

The next field 61, variable in length, is the data field, and it contains data in non-ASCII characters, including control characters in ANSI X3.28 format. It will contain the specific command or task to be performed by a RMU. FIG. 4 indicates the format 65 of all characters, prefix and data, which format includes a low start bit, eight data bits, and a high stop bit. Thus, there will always be at least one logic zero, i.e., the start bit, in every ten bit data character. The message ends with the two byte CRC error check field 63.

When a RMU responds to a command from MMU 22, it will prepare a message in the second format 51 just described, inserting the data requested by the specific command from MMU 22 in the data field 61.

Figure 5:
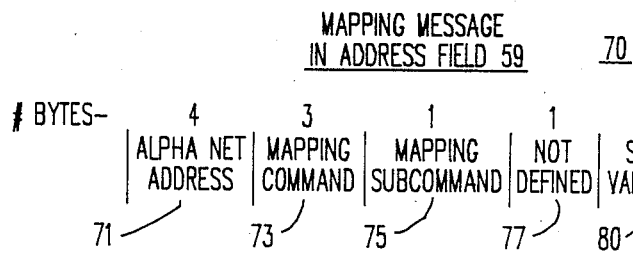
FIG. 5 sets forth a mapping message format which may be used in the address field portion of the message formats shown in FIGS. 2 and 3.

When MMU 22 desires to map addresses of the refrigerated containers or reefers 12 connected to monitoring system 50, it redefines the 10 byte RMU address field 59 shown in FIG. 3 to provide a mapping message 70, the format of which is shown in FIG. 5. When the message type in field 55 indicates mapping, each RMU will look for a mapping message in field 59, instead of treating it as an RMU address field.

The first four bytes 71 of mapping message 70, called the alpha net address, set forth either a total or a particular mapping address which, for example, will be recognized by all reefers connected to any given power line, or by a specific segment or bank of reefers. For example, field 71 may contain a universal address to which all RMUs will respond, or it may contain a predetermined vendor identifier to which only RMUs provided by the identified vendor will respond. The next three bytes 73 set forth a general mapping command. The next byte 75 identifies a specific mapping subcommand which identifies a processing procedure to be used in the mapping strategy of the invention. By way of example, four mapping subcommands or processing procedures which may be used are set forth in Table I The next byte 77 is not used, but since this is an ASCII field, it must contain any ASCII numeric or alphanumeric character. The final byte 80 is used by MMU 22 to provide a number which establishes the number range of modulo (16) to be used by the RMUs when generating or modulo (of 16) to be their random numbers. A random number generated by a RMU must be within the range of numbers indicated by the number in field 80. The lower nibble selects one of the 16 ranges, while the upper nibble is set to provide an ASCII ranged number.

TABLE I

| MAPPING SUBCOMMAND | RMU PROCESS |
| --- | --- |
| Initiate New Map | For Mapping A Large Number of Reefers |
| General New Map | For Mapping A Smaller Number of Reefers |
| Change Shift Map | For Reducing the Modulo |
| Decrement Map | For Decrementing Random Numbers |

The mapping subcommands in TABLE I, which will be described in more detail as exemplary programs which use them are described, all utilize the shift variable in field 80.

Figure 6:
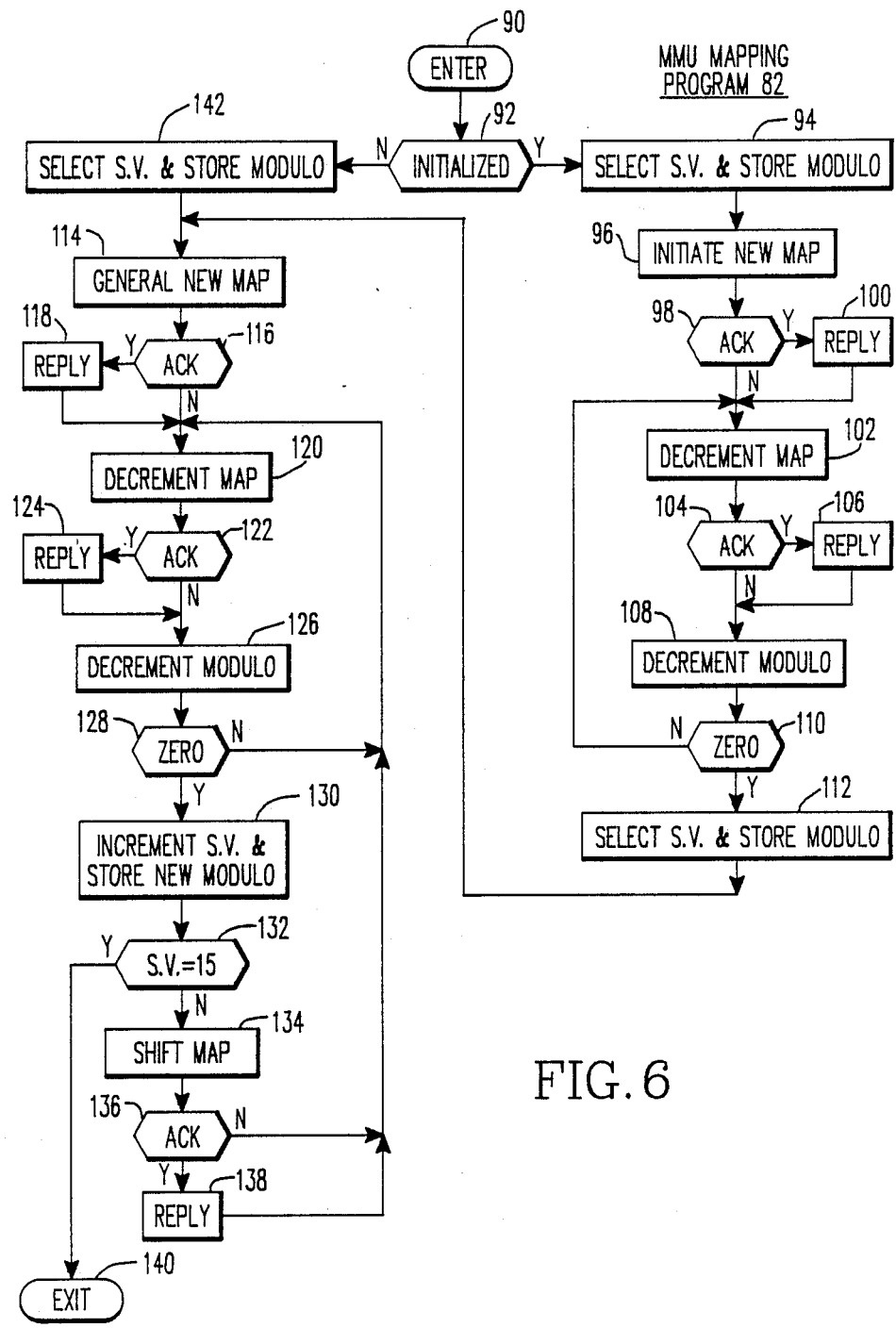
FIG. 6 is a flow chart of a MMU mapping program constructed according to the teachings of the invention.

FIG. 6 is a flow chart of a mapping program 82 which may be used by MMU 22 in implementing the mapping method of the invention. FIG. 7 is a ROM map 84 of a read-only memory storage location used by MMU 22 during the running of program 82 which illustrates: a) numbers, called "shift variables", which are selectively used in field 80 of mapping message format 70 shown in FIG. 5; b) 16 bit masks associated with the shift variables; and c) the number range or modulo associated with each shift variable and mask. FIG. 8 is a ROM map 86 of a read-only memory storage location used by MMU 22 during the running of program 82 which illustrates a) certain modulos and shift variables from ROM map 84 that may be stored for specific use by program 82, according to the maximum number of reefers to be connected to monitoring system 50; b) the mapping command and subcommands; and c) program constants used by program 82. FIG. 9 is a RAM map 88 illustrating a random-access storage location where certain program variables are stored during the running of program 82.

The specific implementation of the new mapping strategy of the invention, which adapts to the size of its environment, set forth in FIG. 6 and the remaining figures, is best explained by first examining the ROM map 84 of FIG. 7. The shift variable or number used in field 80 of the mapping message of FIG. 5 is a number between 0 and 15. This number is set forth in the lower four bits of the byte located in field 80. The number dictates how many logic zeros are shifted left, starting with the most significant bit (MSB) of a sixteen bit mask originally containing sixteen logic ones. The highest number or modulo for each shift variable is also listed. When a RMU is directed to generate a sixteen bit random number, the random number is logically AND'ed with the mask generated in response to the number found in field 80 of the mapping message 70. This automatically places a sixteen bit random number within the number range selected by MMU 22, as it removes the specified number of most significant bits from the random number.

With this background in mind, the MMU mapping program 82 shown in FIG. 6 is entered at 90 and step 92 checks to determine if the system has just been initialized, e.g., when power is initially applied to the MMU 22 at start-up, or after a power failure. If this is an initialization procedure, all of the reefers connected to monitoring system 10 must have their unique addresses logged in or mapped by MMU 22. Step 92 proceeds to step 94 which selects a shift variable and stores the associated modulo in RAM 88 (FIG. 9). For example, step 94 may select a modulo, such as modulo "x", and the associated shift variable from ROM map 86 shown in FIG. 8. Modulo "x" is preselected from the sixteen possible numbers shown in FIG. 7 according to the maximum number of reefers to be monitored by system 50. For example, if four hundred reefers is the maximum, shift variable 4 may be selected and the random numbers will be generated between 0 and 4095. If shift variable 5 is selected, the random numbers will be generated between 0 and 2047.

Step 96 then prepares and sends a mapping command in the first format 42 wherein the mapping message 70 is disposed in data field 48. The mapping message 70 would include the general mapping command in field 73 and the "initiate new map" subcommand in field 75. The mapping command is translated to the second format 51 by NCCU 24 and applied to the power line 26. The mapping message 70 is located in the RMU address field 59 of the second format 51. The RMUs detect the mapping command and process the mapping message, as will be hereinafter described relative to the RMU program of FIG. 10.

Program 82 may have a delay loop to give a RMU whose random number is zero time to respond with its unique address, and then step 98 checks to see if a valid response to the mapping command was received. If a RMU responded with its address, step 100 addresses a polling reply to this RMU using its unique address, and this RMU now knows that it has been mapped into the monitoring system.

Steps 98 and 100 both proceed to step 102 which prepares and sends a mapping command having a mapping message which includes the "decrement map subcommand". Each RMU will decrement its random number, and a RMU having a random number which was decremented to zero by this subcommand will respond with its unique address. Step 104 checks for a valid response, and step 106 sends a reply to a RMU which responds. Step 108 now decrements the stored modulo so the next step, step 110, will know when all numbers of the modulo have been checked. Step 110 returns to step 98 until the modulo has been reduced to zero, at which time it branches to step 112.

Step 112 initiates a portion of program 82 which detects reefers which were not mapped by steps 94 through 110, such as due to message collisions by reefers having the same random number. Step 112 selects another modulo from ROM map 86 of FIG. 8, such as modulo "y", and the associated shift variable, and step 114 incorporates it into a mapping command having a mapping message which includes the "general new map" subcommand. Since most of the reefers will have been mapped by the "initiate new map" subcommand, the shift variable number may be a much larger number, resulting in a much smaller modulo. The program then loops through this smaller modulo in steps 116, 118, 120, 122, 124, 126 and 128, which are similar to steps 98 through 110.

When the modulo has been decremented to zero, step 130 increments the shift variable used for the general new map command and stores the new modulo. Step 132 checks to see if the shift variable has been incremented to 15. If it has not, step 134 prepares and sends a mapping command which contains the "shift map" subcommand, using the incremented value of the shift variable. Step 136 looks for an ACK from a RMU, and if one is received, step 138 sends a reply. Step 138 and the "no" branch of step 136 return to step 120. This continues until step 132 finds that the shift variable has been incremented to 15, at which time the program exits at 140.

Program 82 is periodically entered to pick up new reefers which may have been connected to the monitoring system following initialization. When this occurs, step 92 proceeds to step 142 which selects a shift variable, such as modulo "z", from ROM map 86, and it stores the associated modulo. The program then repeats steps 114 through 140.

Figure 10:
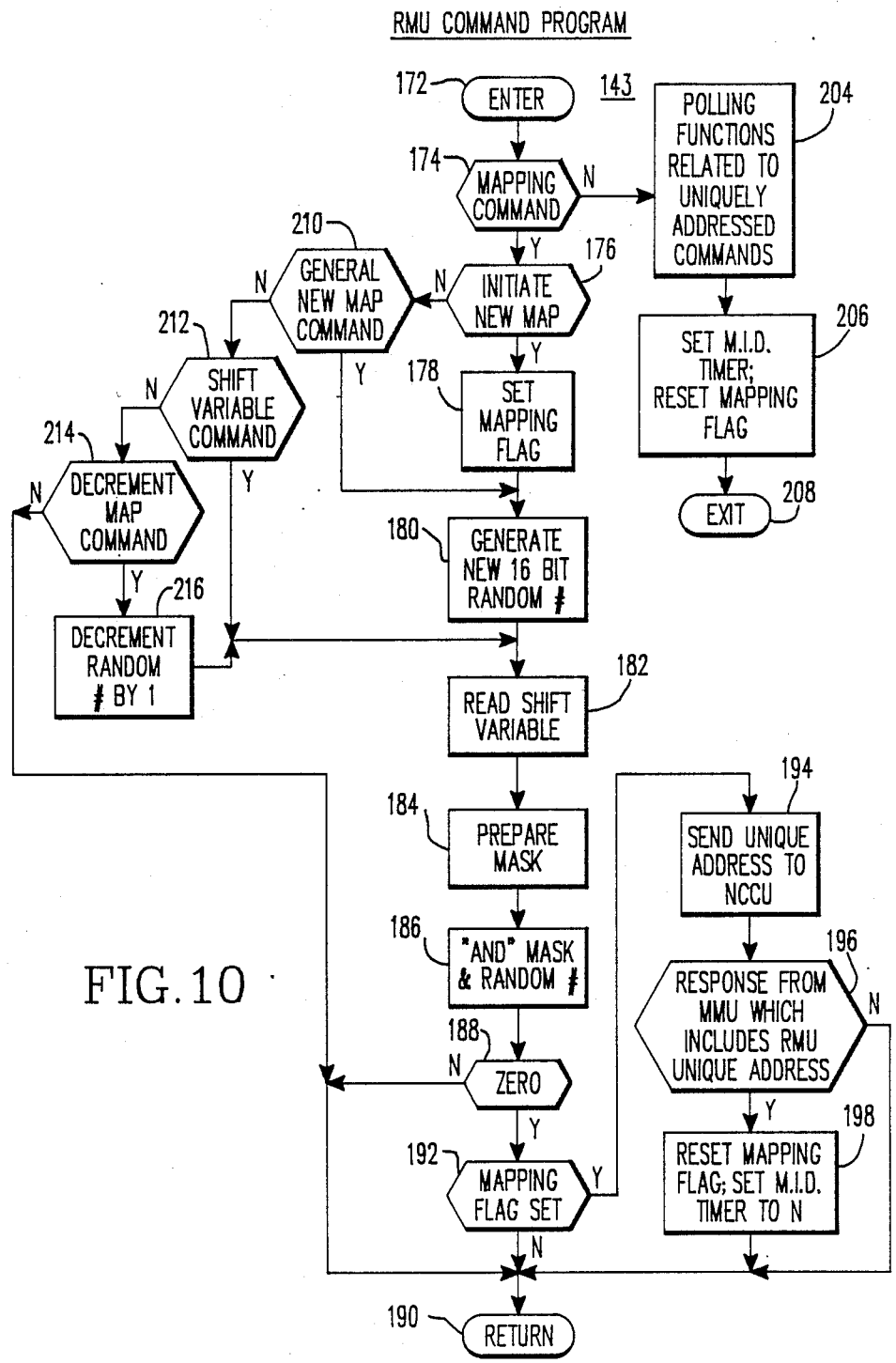
FIG. 10 is a flow chart of a RMU mapping program constructed according to the teachings of the invention.

FIG. 10 is a flow chart of a RMU mapping command program 143 which implements the teachings of the invention. FIG. 11 is an initialization and reset program 144, and FIG. 12 is a timer program 146. Figure 13 is a RAM map 148 which contains program variables used by the RMU programs 143, 144 and 146.

The power up and reset program 144 shown in FIG. 11 is entered during initialization of a RMU, during an internal reset, such as from a "dead man" reset procedure, and during an external reset initiated by MMU 22. The purpose of this program is to set a mapping flag shown in the RAM map 48 of FIG. 13, which flag is used by program 143. More specifically, program 144 is entered at 150 and step 152 determines if this is a power up or initialization procedure. If so, step 154 sets the mapping flag, to indicate that mapping of this RMU is required, and the program exits at 156. If step 152 finds that the RMU isn't being initialized, steps 158 and 160 check for internal and external resets. Upon either of these steps finding a reset, step 154 sets the mapping flag.

The timing program 146 of FIG. 12 is periodically entered at 162 to perform general timing functions, indicated at 164, and to check in step 166 to see if a timer referred to as a map inhibit delay timer (M.I.D.) is active. If so, step 168 decrements this timer. Step 169 determines if the M.I.D. timer has been decremented to zero. If it is zero, step 170 sets the mapping flag and the program exits at 171. If the M.I.D. timer is not zero, step 169 exits at 171.

The main RMU mapping program is entered at 172 and step 174 determines if a received command contains the general mapping command. If so, step 176 checks the mapping subcommand to determine the type of processing requested by MMU 22. If step 176 finds that the subcommand is "initiate new map", step 178 sets the mapping flag. The mapping flag will remain set until the RMU has been mapped into the monitoring system and has subsequently received a polling command from MMU 22 using the unique address of the RMU.

Step 180 then generates a sixteen bit random number and step 182 reads the shift variable portion 80 of the mapping message 70. Step 184 prepares a mask of sixteen logic ones, and a number of logic zeros are shifted into the mask, starting from the MSB, with the number of logic zeros being equal to the shift variable found in field 80. Step 186 performs a logical AND with the mask and the sixteen bit random number to provide a random number having a value within the modulo selected by MMU 22. Step 188 checks to see if the result of the logical AND is zero. If it is not zero, the program returns at 190. If it is zero, the unique address will be returned if the mapping flag is set, as will be hereinafter explained.

FIG. 14 illustrates steps 180 thru 186 using a shift variable of 8 and a modulo of 256. The mask of logic ones has eight logic zeros shifted into the mask from the MSB, and when this mask is AND'ed with the sixteen bit random number it removes the eight MSBs of the random number, producing a random number which cannot exceed the modulo of 256.

The next mapping subcommand will be "decrement map", so step 176 will proceed through the "initiate new map" subcommand of step 176, through the "general new map" subcommand of step 210, and the "shift variable" subcommand of step 212, until reaching the decrement map subcommand of step 214. Step 216 decrements the random number by one and proceeds to step 182 to read the shift variable. When step 188 finds that the random number is zero, step 192 checks to see if the mapping flag of the RMU is set. If it is not set, the RMU will not respond, and the program exits at 190. If step 192 finds the mapping flag set, step 194 prepares and sends a message to MMU 22 which includes its unique address in the data field. The RMU then awaits an acknowledge (ACK) from MMU 22. For example, a reply counter may be set to provide time sufficient to receive an ACK. Step 196 checks for an ACK. If none is received, step 196 proceeds to exit 190. Only later, when MMU 22 returns with a poll command and the correct unique address will the mapping flag be reset. If an ACK is received using the address of the RMU, step 198 resets the mapping flag, and it sets the M.I.D. timer shown in RAM map 148. The M.I.D. timer, for example, may be set to a predetermined value such as one hour. The value is stored in the RMU's ROM. The mapping flag will be set when the M.I.D. time expires, but the M.I.D. timer is restarted at the predetermined value each time the RMU is addressed by MMU 22 using the unique address of the RMU. This insures that MMU 22 does not lose track of the RMU for some reason and fails to periodically check upon its status within the preset period of time. More specifically, when step 174 finds that the command is not a mapping command, but a polling command which specifically addresses the RMU, step 204 performs whatever function the polling command requires, and step 206 sets the M.I.D. timer to the predetermined value and resets the mapping flag. Step 206 returns at 208.

The general new map subcommand, when found in step 210, skips step 178 which set the mapping flag, as it is looking only for RMUs which were missed by the initiate new map subcommand, or which were connected after system initialization. The remainder of the steps are as hereinbefore described.

The changes shift variable subcommand, detected in step 212, skips steps 178 and 180, using the same random step 212, skips step number previously generated and applies a new shift variable to it to reduce or increase the modulo.

The decrement map subcommand, when detected in step 214, as hereinbefore stated, decrements the random number by one in step 216. Step 216 will decrement a random number which was previously decremented to zero, causing it to roll over. Thus, if the mapping flag is not reset in response to receiving a reply from MMU 22, the rolled over random number will be used and decremented by the program until such time a new random number is generated by a command which uses step 180.

We claim as our invention:

1. A method of mapping addresses of a plurality of refrigerated containers having uniquely addressable remote monitoring units (RMUs) connected to a power line carrier based monitoring system which includes a master monitoring unit (MMU), wherein the MMU includes computer based means for mapping the RMUs with predetermined mapping commands, and the RMUs include computer based means for responding to the mapping commands, including means for generating a random number and means for preparing mapping response messages, comprising the steps of:
   mapping the RMUs of the refrigerated containers by the MMU with a predetermined first mapping command applied to the power line,
   responding to the first mapping command by the RMUs connected to the power line communication system,
   said mapping step including the steps of:
   selecting a modulo having a range determined by the number of containers expected to be mapped,
   and inserting the selected modulo into the first mapping command,
   said responding step including the steps of:
   generating a random number within the range of the modulo in the first mapping command,
   inserting the container's address into a mapping response message,
   and applying the mapping response message to the power line at a time responsive to the magnitude of the random number.

2. The method of claim 1 wherein each RMU has a mapping flag which enables each RMU to initiate the step of applying a mapping response message to the power line only when set, and including the steps of setting and resetting the mapping flag in response to predetermined conditions.

3. The method of claim 2 wherein a predetermined condition which will set the mapping flag of a RMU is initial power-up of a RMU.

4. The method of claim 2 wherein a predetermined condition which will set the mapping flag of a RMU is a self initiated reset.

5. The method of claim 2 wherein a predetermined condition which will set the mapping flag of a RMU is a reset of RMU initiated by the MMU.

6. The method of claim 5 wherein the mapping step includes the step of selecting a specific mapping command being one of said plurality of mapping commands, said first mapping command, when selected, being a general mapping command which requests that all RMUs provide a mapping response message,
and wherein the step of mapping with the first mapping command is a predetermined condition which will set the mapping flags of all RMUs.

7. The method of claim 2 including the step of polling a selected RMU by the address of the associated container, and wherein a predetermined condition which will reset the mapping flag of a RMU is a polling step by the MMU which utilizes the address of the associated container.

8. The method of claim 2 including the step of polling a RMU of a selected container by the MMU using the selected container's address following the receipt by the MMU of a mapping response message,
and including the step of resetting the mapping flag of the RMU associated with the specifically addressed container.

9. The method of claim 8 including the step of setting the mapping flag of a RMU which successfully responded to a prior mapping command after a predetermined period of time.

10. The method of claim 9 wherein the predetermined period of time starts each time a container is specifically addressed by the MMU.

11. The method of claim 2 wherein the mapping step includes the step of selecting a specific mapping command from a plurality of mapping commands, with the first mapping command, when selected, requesting all RMUs to provide a mapping response message, and wherein the step of mapping with the first mapping command sets the mapping flags of all RMUs.

12. The method of claim 11 wherein the plurality of mapping commands includes a second mapping command, and including the steps of
selecting a modulo for the second mapping command,
inserting the modulo in the second mapping command,
and mapping the refrigerated containers with the second mapping command,
and including a responding step responsive to the step of mapping with the second mapping command which includes the step of generating a new random number within the range of the modulo in the second mapping command.

13. The method of claim 12 wherein the plurality of mapping commands includes a third mapping command, and including the steps of:
selecting a modulo for the third mapping command,
inserting the modulo in the third mapping command,
and mapping the refrigerated containers with the third mapping command,
and including a responding step responsive to the step of mapping with the third mapping command which includes the step of reducing the magnitude of a previously generated random number within the new modulo without generating or decrementing a new random number.

14. The method of claim 13 wherein the plurality of mapping commands includes a fourth mapping command, and including the step of:
mapping the refrigerated containers with the fourth mapping command,
and including a responding step responsive to the step of mapping with the fourth mapping command which includes the step of decrementing a previously generated random number, and wherein the applying step is initiated when the random number has been decremented to zero by the decrementing step.

15. The method of claim 14 wherein the step of decrementing a random number will decrement the number past zero, enabling the applying step to be repeated when the the random number is again decremented to zero, if a prior applying step did not result in the resetting of he associated mapping flag.

16. The method of claim 1 wherein the applying step is initiated by a RMU when its associated random number is zero.

17. The method of claim 16 wherein the polling step additionally includes the step of requesting the RMUs to decrement their random numbers, with each RMU decrementing its random number in response to said requesting step and initiating the applying step when its random number has been decremented to zero.

18. The method of claim 17 wherein the MMU collects the addresses of containers which may have had like random numbers generated, by the step of mapping the refrigerated containers with a second mapping command having a modulo different than the modulo in the first mapping command, and wherein the RMUs respond to the second mapping command by the steps of generating a new random number within a range responsive to the modulo in the second mapping command, with any RMU having a set mapping flag preparing and applying a mapping response to the power line with the address of the associated container, when the new random number has been decremented to zero by the decrementing step.

19. The method of claim 1 wherein the step of selecting a modulo provides a number N which indicates the number of most significant bits to discard in the random and wherein the step of generating a random number within the range of the selected modulo includes the steps of:
generating a random number in binary having a predetermined number of bits,
and removing the N most significant bits from the generated random number.

20. The method of claim 19 wherein the step of removing the N most significant bits from the generated random number indicated by the selected modulo includes the steps of:
generating a mask of logic ones having the same number of bits as the random number,
setting the N most significant bits of the mask to logic zero,
and ANDing the modified mask and the random number.

* * * * *